Sheet 1, 2 Sheets.
T. Tripp.
Screw Propeller.
No. 2,061. Reissued Aug. 29, 1865.
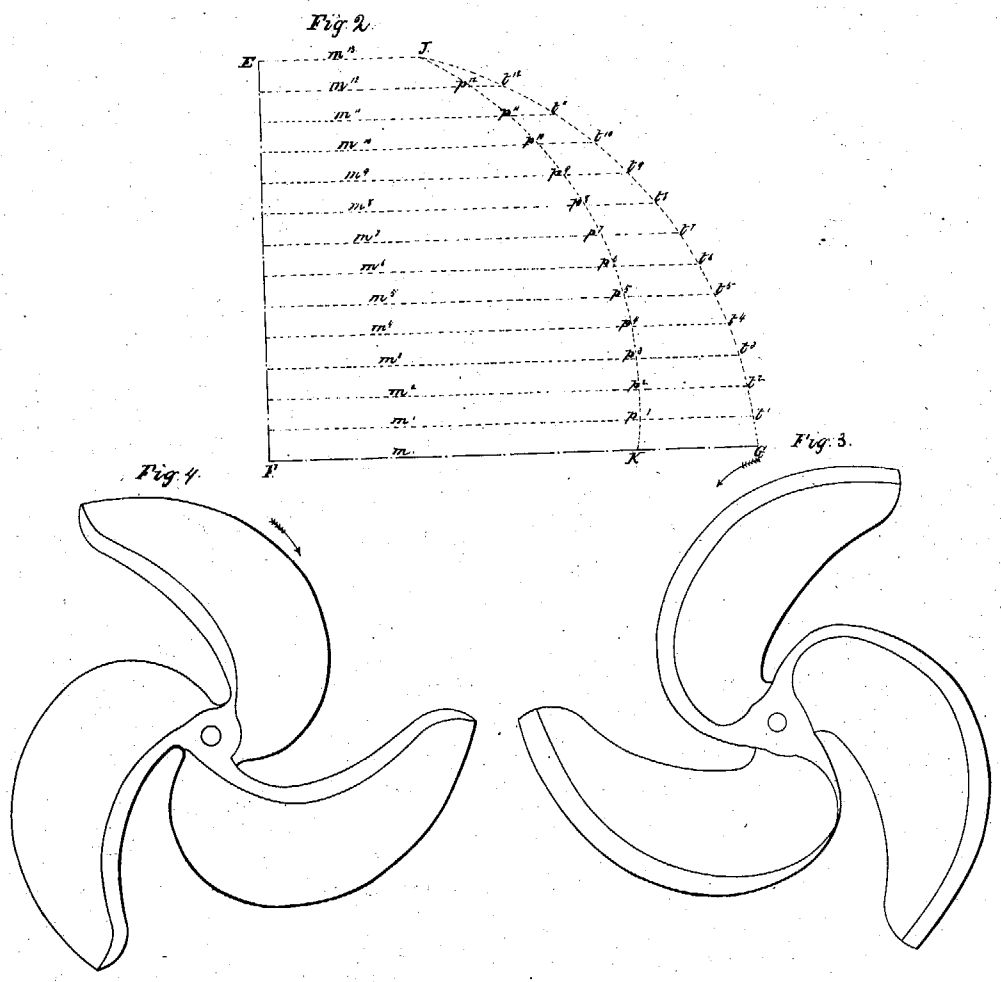
Witnesses:
Henry F. Brown
J. W. Coombs
Inventor:
R. B. Campbell
Atty.

Sheet 2, 2 Sheets.
T. Tripp.
Screw Propeller.
No. 2,001.
Reissued Aug. 29, 1865.
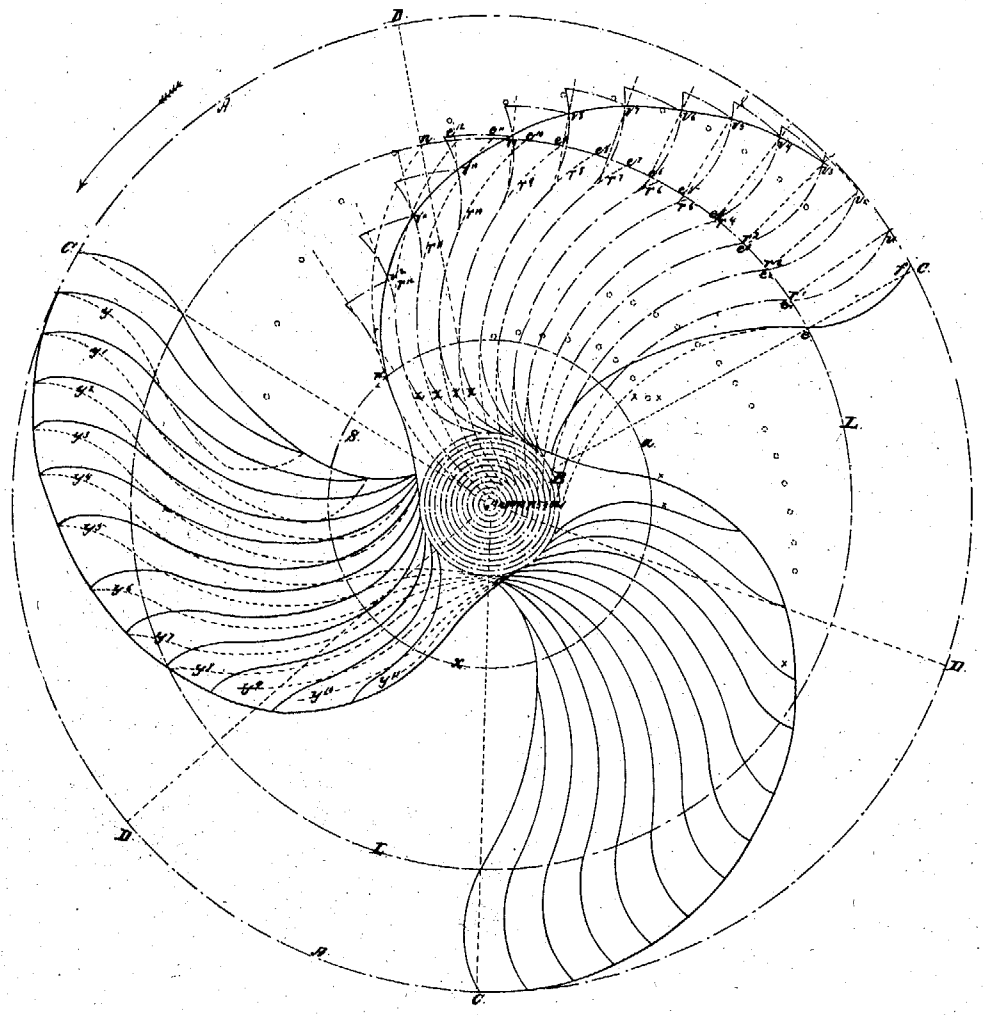
Witnesses:
Henry C. Brown
J. N. Coombs
Inventor:
R. B. Campbell & Co.
Y. Tripp

UNITED STATES PATENT OFFICE.

R. E. CAMPBELL, OF NEW YORK, N. Y., ASSIGNEE OF THOMAS TRIPP.

IMPROVED PROPELLER-WHEEL.

Specification forming part of Letters Patent No. 26,213, dated November 22, 1859; Reissue No. 2,061, dated August 29, 1865.

*To all whom it may concern:*

Be it known that I, R. E. CAMPBELL, of the city, county, and State of New York, am the assignee of Letters Patent dated November 22, 1859, granted to THOMAS TRIPP, for a new and Improved Propeller-Wheel; and I do hereby declare that the following is a full and clear description thereof, reference being had to the accompanying drawings, making a part of this specification, in which—

Figure 1 is a plan which represents the wheel as resting upon the ends of its blades upon a horizontal plane. Fig. 2 is a diagram which aids in explaining the construction of the blades of the wheel. Fig. 3 is a front-end elevation; Fig. 4, a rear-end elevation.

The form of this improved propeller wheel may be ascertained and a pattern from which the wheel is to be cast may be constructed by observing the following formula:

First. The diameter of the wheel being given, strike a circle, A, Fig. 1, the diameter of which shall equal the proposed diameter of the wheel.

Second. The diameter of the hub being given strike a circle, B, from the center of the wheel, the diameter of which shall equal the proposed diameter of the hub.

Third. Determine the length of the chord *e f* of the commencing arc forming the outward curve or hook of the blades—say one-quarter of the radius of the wheel—and strike a circle, L, from the center of the wheel, the radius of which shall be the radius of the wheel minus the length of this chord.

Fourth. Divide the circle A, representing the circumference of the wheel, into three equal parts, or more, according to the number of blades.

Fifth. Through each of the points representing said division draw radii C from the center of the wheel, and from the extremities of these radii lay off distances on the circumference of the wheel and draw radii D to those points thus obtained.

Sixth. The radii C D, intercepting an arc, *e n*, of the circle L, which is divided into thirteen equal parts, corresponding to the number of divisions or layers into which the pattern of the wheel is divided as "laid up."

Seventh. In diagram, Fig. 2, are shown the lines representing these layers, in which diagram the line E F represents the center line of the shaft of the wheel. The distance E F, which is equal to the length of the wheel fore and aft, is divided into thirteen equal parts or a number corresponding to the number of layers of material used in laying up the pattern. Through the points thus obtained draw lines $m$ $m'$ $m^2$ $m^3$, &c., perpendicular to the line E F. These lines will represent the planes formed by the different layers, and it is on these planes that the curved lines forming the outline of the blade will be drawn.

Eighth. The radius of the hub is next divided into thirteen equal parts, corresponding to the number of layers. Through each of these points of division strike circles 1 2 3 4 5, &c., from the center of the wheel.

Ninth. With a radius equal to one-half the radius of the wheel, describe the arc of a circle which shall pass through the point $e$ and be tangent to the outer circle of the hub. This arc will lie upon the plane $m$, Fig. 2. Then, with the same radius, describe an arc which shall pass through the point $e'$ and be tangent to the first inner circle, 1, of the hub. This arc will lie on the plane $m'$. With the same radius describe another arc which shall pass through the point $e^2$ and be tangent to the second inner circle, 2, of the hub, and so on until arcs are successively drawn through each of the division-points on the arc $e$ $n$ and tangent successively to each of the circles 1 2 3 4 5, &c., of the hub, the last arc passing through the point $n$ and terminating at the center $o$ of the wheel. These arcs will describe the main curved surface of the blade, and will lie successively upon the planes $m$ $m'$ $m^2$ $m^3$, &c., Fig. 2.

Tenth. Describe a circle, $x$, from the center of the wheel with a radius one-third the radius of the wheel. Such portions of the arcs last-above described as fall within this circle are not used nor formed upon the surface of the wheel, but arcs $z$ $z$ $z$, of a less radius, which shall be tangent to them at their points of intersection with the circle $x$, and also tangent to the outer circle of the hub, are substituted for them. In order to develop the outward curve or outward arcs of the blade, a series of points must now be formed which will lie successively on the arcs $1e'$ $2e^2$ $3e^3$ $4e^4$, &c., and gradually drawn toward the point W of intersection of the last-described arc $n\ o$ with the circle $x$. To accomplish this, suppose the line $m'\ m^2$, &c., Fig. 2, represent radii of indefinite length, lying in the same perpendicular plane. On the indefinite radius $m$ lay off a distance, F K, equal to the length of the radius $o\ e$, and on the indefinite radius $m^{13}$ a distance, E J, equal to the radius O S. Through the points thus obtained describe the arc J K, cutting the radii $m\ m'\ m''$, &c., in the points $p'\ p^2\ p^3$, &c. Now, if the radii thus obtained be transferred to the plan Fig. 1, and successively moved on their common center $o$ until they successively intersect the arcs $1e'\ 2e^2$, &c., such points of intersection will be the points required—for instance, if the radius $m^9$ be turned on its center until it intersects the arc $9e^9$ at $r^9$, such point of intersection will be one of the points required, the others, $r'\ r^2\ r^3\ r^4$, &c., being found in the same manner.

Twelfth. Through these points $r'\ r^2\ r^3$, &c., draw radii, and prolong them indefinitely beyond these points.

Thirteenth. It is now necessary to find a series of points lying successively on these radii last mentioned, which, starting from $e$, sweep toward the point W. These points are formed in a similar manner to the points $r$. As before, suppose the lines $m'\ m^2$, &c., to represent radii of indefinite length in the same perpendicular plane. The same distance F J on radius $m^{13}$ as before being laid off, and a distance, G, equal to the radius O C of the wheel being laid off on radius $m$, an arc, J G, is drawn through the points thus obtained, cutting the radii in the points $t'\ t^2$, &c. The definite radii thus obtained are transferred to the plan and turned successively on their common center O until they successively coincide with the successive radii upon which the desired points are to lie, their extremities marking the required points—for instance, suppose the radius $m^9$ to be turned until it shall coincide with the radius passing through the point $r^9$. Its length being measured off on said radius will give one of the desired points, $v^9$. The other points, $v'\ v^2$, &c., are obtained in the same manner. The entering edge of the blade is a curved line, C W, passing through these points.

Fourteenth. The arcs which form the outward curve or hook also pass through these points. They are drawn with radii equal to one-fourth the radius of the wheel and with such centers that they will pass through the points $v'\ v^2$, &c., and be tangent to the principal arcs, $1e'\ 2e^2$, &c. The lines $y\ y'\ y^2$, &c., represent the propelling-surface of the blade, and are formed by arcs whose radii are equal to those forming the inward surface of the blade, their centers being moved the thickness of the blade.

This rule of construction will apply to a wheel of any required diameter and of any required "lead," and of any required number of blades.

In stating the formula thus minutely it is not intended to confine it to the precise lines or form described, but to include all such variations thereof as are essentially embraced within the same principles.

The direction of the revolution of the propeller-wheel for propelling vessels in a forward direction is indicated by arrows in Fig. 1.

A propeller-wheel constructed according to the principles of this invention has the following distinguishing characteristics:

First. The main propelling-surfaces of the blades, commencing from the hub, have on both sides a curvature outward from the center in a direction the reverse of that of the revolution for forward propulsion in arcs, the radii of which are one-half the length of the radius of the wheel.

Second. The outer portion or hook of the blade has on both sides a curvature outward in a direction the reverse of the direction of the outward curvature of the main propelling-surface—that is to say, in the same direction as that of the revolution for forward propulsion in arcs—the radii of which are one-fourth the radius of the wheel and with gradually diminishing chords. This hook or reversed curvature of the blade enables it to enter the water edgewise without breaking it.

Third. The blades overhang the hub in a rearward direction, and the rearward overhang, operating in combination with the curvatures of the surfaces above described, causes the water set in motion by the blades to assume the form of an unbroken solid spiral column, against which the blades push with great effect, without either lifting or carrying water and with extremely little slip.

What I claim as the invention of the said THOMAS TRIP, JR., and desire to secure by Letters Patent, is—

A propeller-wheel having blades formed in respect to their main propelling-surfaces, and in respect to their outward arcs, substantially as herein described.

R. E. CAMPBELL.

Witnesses:
HENRY T. BROWN,
J. W. COOMBS.